US009935786B2

(12) United States Patent
Zwart et al.

(10) Patent No.: US 9,935,786 B2
(45) Date of Patent: Apr. 3, 2018

(54) LOW POWER BIDIRECTIONAL BUS

(71) Applicant: Cirrus Logic International Semiconductor Ltd., Edinburgh (GB)

(72) Inventors: Willem Zwart, Edinburgh (GB); John Bruce Bowlerwell, Peterhead (GB); Michael Page, Stonehouse (GB); Alastair Boomer, Edinburgh (GB)

(73) Assignee: Cirrus Logic, Inc., Austin, TX (US)

( * ) Notice: Subject to any disclaimer, the term of this patent is extended or adjusted under 35 U.S.C. 154(b) by 0 days.

(21) Appl. No.: 15/063,124

(22) Filed: Mar. 7, 2016

(65) Prior Publication Data
US 2016/0269193 A1    Sep. 15, 2016

Related U.S. Application Data

(60) Provisional application No. 62/130,304, filed on Mar. 9, 2015.

(30) Foreign Application Priority Data

May 11, 2015 (GB) .................................. 1508002.1

(51) Int. Cl.
*H04L 12/40* (2006.01)
*H04L 5/14* (2006.01)
(Continued)

(52) U.S. Cl.
CPC .... *H04L 12/40013* (2013.01); *G06F 13/4291* (2013.01); *H04L 5/1476* (2013.01);
(Continued)

(58) Field of Classification Search
CPC ............. H04L 12/40013; H04L 5/1476; G06F 13/4291; G06F 13/4027; G06F 13/4282; G06F 2213/0016
See application file for complete search history.

(56) References Cited

U.S. PATENT DOCUMENTS 3,967,058 A    6/1976 Moriya et al.
4,847,867 A    7/1989 Nasu et al.
(Continued)

FOREIGN PATENT DOCUMENTS

| CA | 1196407 A | 11/1985 |
| GB | 1401436 A | 7/1975 |
| WO | 2007143695 A2 | 12/2007 |

OTHER PUBLICATIONS

Combined Search and Examination Report under Sections 17 and 18(3), Application No. GB1508002.1, dated Nov. 18, 2015, 5 pages.
(Continued)

*Primary Examiner* — Janice Tieu
(74) *Attorney, Agent, or Firm* — Jackson Walker L.L.P.

(57) ABSTRACT

A method of sending information between first and second modules connected by a signal bus comprises generating a clock signal in the first module, and imposing the clock signal on a first line of the bus. A first pattern of bit values is transmitted from the second module to the first module on a second line of the bus, during first half-periods of each period of said clock signal. A second pattern of bit values is transmitted from the first module to the second module on the second line of the bus, during second half-periods of each period of said clock signal, wherein the second half-periods of each period of said clock signal are different from the first half-periods of each period of said clock signal. Information can then be transmitted from the first module to the second module by altering the second pattern of bit values; and information can be transmitted from the second module to the first module by altering the first pattern of bit values.

26 Claims, 10 Drawing Sheets

(51) Int. Cl.
*G06F 13/40* (2006.01)
*G06F 13/42* (2006.01)

(52) U.S. Cl.
CPC ...... *G06F 13/4027* (2013.01); *G06F 13/4282* (2013.01); *G06F 2213/0016* (2013.01)

(56) References Cited

U.S. PATENT DOCUMENTS

| | | |
|---|---|---|
| 5,905,716 A | 5/1999 | Vidales |
| 6,625,206 B1 | 9/2003 | Doblar |
| 6,772,251 B1 | 8/2004 | Hastings et al. |
| 2010/0017553 A1* | 1/2010 | Laurencin ........... G06F 13/4027 710/307 |
| 2014/0025979 A1* | 1/2014 | Yagi ..................... G06F 1/3215 713/323 |
| 2015/0151960 A1* | 6/2015 | McCleland ............... B81B 7/02 73/865.8 |

OTHER PUBLICATIONS

International Search Report and Written Opinion, Application No. PCT/GB2016/050628, dated May 11, 2016, 11 pages.

\* cited by examiner

LOW POWER BIDIRECTIONAL BUS

FIELD OF DISCLOSURE

In some situations, it is useful to connect modules by means of a bidirectional wired data bus, to allow data to be sent by a first module to a second module, and to allow data to be sent from the second module to the first module.

SUMMARY

According to a first aspect of the present invention, there is provided a method of sending information between first and second modules connected by a signal bus, the method comprising:
  generating a clock signal in the first module, and imposing the clock signal on a first line of the signal bus;
  transmitting a first pattern of bit values from the second module to the first module on a second line of the signal bus, during first half-periods of each period of said clock signal; and
transmitting a second pattern of bit values from the first module to the second module on the second line of the signal bus, during second half-periods of each period of said clock signal, wherein the second half-periods of each period of said clock signal are different from the first half-periods of each period of said clock signal; and the method further comprising at least one of:
  in order to transmit information from the first module to the second module, transmitting an altered second pattern of bit values; and
  in order to transmit information from the second module to the first module, transmitting an altered first pattern of bit values.

According to a second aspect of the present invention, there is provided a host module, configured to:
  generate a clock signal, and impose the clock signal on a first line of a signal bus;
  detect a first pattern of bit values transmitted on a second line of the signal bus, during first half-periods of each period of said clock signal;
transmit a second pattern of bit values on the second line of the signal bus, during second half-periods of each period of said clock signal, wherein the second half-periods of each period of said clock signal are different from the first half-periods of each period of said clock signal; and being further configured:
  in order to transmit information, to transmit an altered second pattern of bit values; and/or
  in order to receive information, to detect an altered first pattern of bit values.

According to a third aspect of the present invention, there is provided an accessory module, configured to:
  receive a clock signal on a first line of a signal bus;
  transmit a first pattern of bit values on a second line of the signal bus, during first half-periods of each period of said clock signal;
receive a second pattern of bit values on the second line of the signal bus, during second half-periods of each period of said clock signal, wherein the second half-periods of each period of said clock signal are different from the first half-periods of each period of said clock signal; and being further configured:
  in order to receive information, to detect an altered second pattern of bit values; and/or
  in order to transmit information, to transmit an altered first pattern of bit values.

According to a fourth aspect of the present invention, there is provided a master module, comprising:
  a clock output buffer to drive a clock signal onto a first terminal;
  an input buffer for receiving a data signal at a second terminal;
  controller circuitry for detecting a first pattern of bit values in the received data signal during first half-periods of each period of said clock signal;
  controller circuitry for generating a second pattern of bit values;
  output buffer circuitry for driving the second pattern of bit values onto the second terminal during second half-periods of each period of said clock signal, wherein the second half-periods of each period of said clock signal are different from the first half-periods of each period of said clock signal;
  wherein the controller circuitry is adapted to transmit information by altering the second pattern of bit values; and to receive information by detecting an altered first pattern of bit values.

According to a fifth aspect of the present invention, there is provided an integrated circuit comprising a master module according to the fourth aspect.

According to a sixth aspect of the present invention, there is provided a slave module comprising:
  an clock input buffer to receive a clock signal at a first terminal;
  an input buffer for receiving a data signal at a second terminal;
  controller circuitry for detecting a second pattern of bit values in the received data signal during second half-periods of each period of said clock signal;
  controller circuitry for generating a first pattern of bit values;
  output buffer circuitry for driving the first pattern of bit values onto the second terminal during first half-periods of each period of said clock signal, wherein the second half-periods of each period of said clock signal are different from the first half-periods of each period of said clock signal;
  wherein said controller circuitry is adapted to transmit information by altering the first pattern of bit values; and to receive information by detecting an altered second pattern of bit values.

According to a seventh aspect of the present invention, there is provided an integrated circuit comprising a slave module according to the sixth aspect.

When operating, this provides a means for transmitting a clock from a host to accessory and receiving a robust signal confirming the continuing attachment and operation of the accessory without any contention at either end of the bus despite the inevitable transmission propagation delays up and down the bus, and thus avoiding any resulting EMI issues due to e.g. driver current spikes. The bus also provides a simple but robust mechanism for robust transmission of occasional control data or similar.

Also, embodiments of this bus maybe used to provide a low power mode on signal wires which are also configured for use as a higher-speed differential data bus, with a clean hand-over from one mode to the other, and the ability to robustly signal mode change request or other information up and down the bus.

BRIEF DESCRIPTION OF THE DRAWINGS

Embodiments of the invention will now be described by way of example only with respect to the accompanying drawings, of which.

The description below sets forth example embodiments according to this disclosure. Further example embodiments and implementations will be apparent to those having ordinary skill in the art. Further, those having ordinary skill in the art will recognize that various equivalent techniques may be applied in lieu of, or in conjunction with, the embodiments discussed below, and all such equivalents should be deemed as being encompassed by the present disclosure.

DETAILED DESCRIPTION

Figure 1:
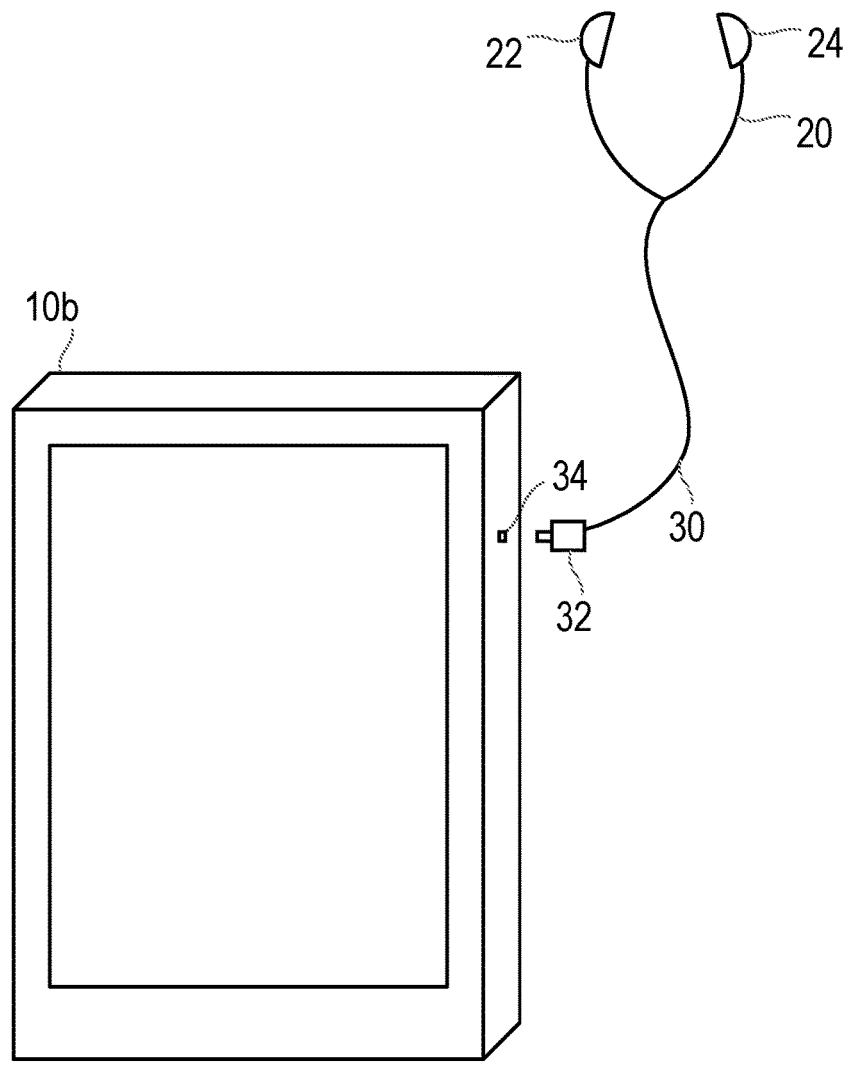
FIG. 1 illustrates an audio system.

FIG. 1 shows an audio system, as just one example of a system using the methods described herein.

Specifically, FIG. 1 shows a host device 10, which in this example takes the form of a codec in a smartphone, but which may be any device. The circuits and method described here may be used in situations where the host device is a portable audio device, but may also be used in other situations. In this example, the host device has audio processing capability.

FIG. 1 also shows an accessory product 20, which in this example takes the form of a pair of earphones, but which may be any device. In this example, the pair of earphones has two earpieces 22, 24, each of which includes a speaker for reproducing sound in response to audio signals transferred from the host device 10. Each of the earpieces 22, 24 also includes at least one microphone, for example for detecting ambient noise in the vicinity of the wearer.

Signals representing the ambient sound are then transferred from the earphones to the host device 10, which performs a noise cancellation function using an algorithm and generates anti-noise signals that it transfers to the earphones for playback. The effect of playing back the anti-noise signals is that the level of ambient noise heard by the wearer is reduced, and the wanted sounds (music, speech, or the like) that are also being transferred from the host device 10 are therefore more audible.

Thus, data is transmitted bidirectionally, from a suitable module in the host device to a module in the accessory product, and from the module in the accessory product to the module in the host device. As noted above, there are multiple situations in which this requirement exists, and FIG. 1 shows just one example of such a system.

The accessory product 20 is connected to the host device 10 by means of a cable 30. In one example, the cable 30 is detachable from at least one of the portable communications device and the audio accessory. In some embodiments, the cable 30 is permanently attached to the accessory 20, and may be provided with a conventional 4-pole TRRS jack 32, while the host device 10 is provided with a matching 4-pole socket 34. In other examples, the cable may be in any suitable format, for example it may be a USB Type-C connector, which similarly has four poles available for an audio interface. As a further alternative, the accessory product (or the host device) may be provided in a USB Stick dongle, with data being transferred between the dongle and the other device over a USB-compliant wired communications link. These are simply examples of transmission lines that can be used to carry bidirectional data between two devices.

As mentioned above, applications exist, for which it is necessary for data to be transmitted bidirectionally between the host device and the accessory device. For example, in order to be able to use noise cancellation, it is necessary for signals detected by microphones in the earpieces 22, 24 to be transmitted from the accessory device to the host device. Somewhat similarly, a voice recognition application in the host device may also operate on signals detected by microphones in the earpieces 22, 24 of the accessory device.

In these applications, it is generally required that data be transferred between the host device and the accessory device at relatively high data rates. Therefore, the bus needs to be capable of handling these high data rates. However, there are periods when there is little or no data to be transferred, and so it is advantageous to provide a low power mode of operation of the bus, in which only limited amounts of data can be transferred between the host device and the accessory device.

Although an embodiment is described below, in which the accessory has a low power mode, and the limited amounts of data that can be transferred between the host device and the accessory device are used to signal that the accessory device will enter a higher power mode, it will be appreciated that the system described herein can be used in any situation in which it is desirable to transmit data between two devices.

For example, the method described herein can be used to pass commands from an otherwise inactive accessory, where the commands correspond to particular buttons being pressed, or touch screen inputs, on the accessory. As another example, the information passed from the accessory to the host can relate to any parameter relating to the physical environment of the accessory, for example from touch or proximity sensors, temperature sensors, motion sensors, biomedical transducers, or the like.

As described in more detail below, the method involves transmitting a clock signal that can be detected by the accessory, and so there is a particular advantage in using this method when the accessory uses that clock signal. However, there are embodiments in which the accessory does not use the clock signal.

Figure 2:
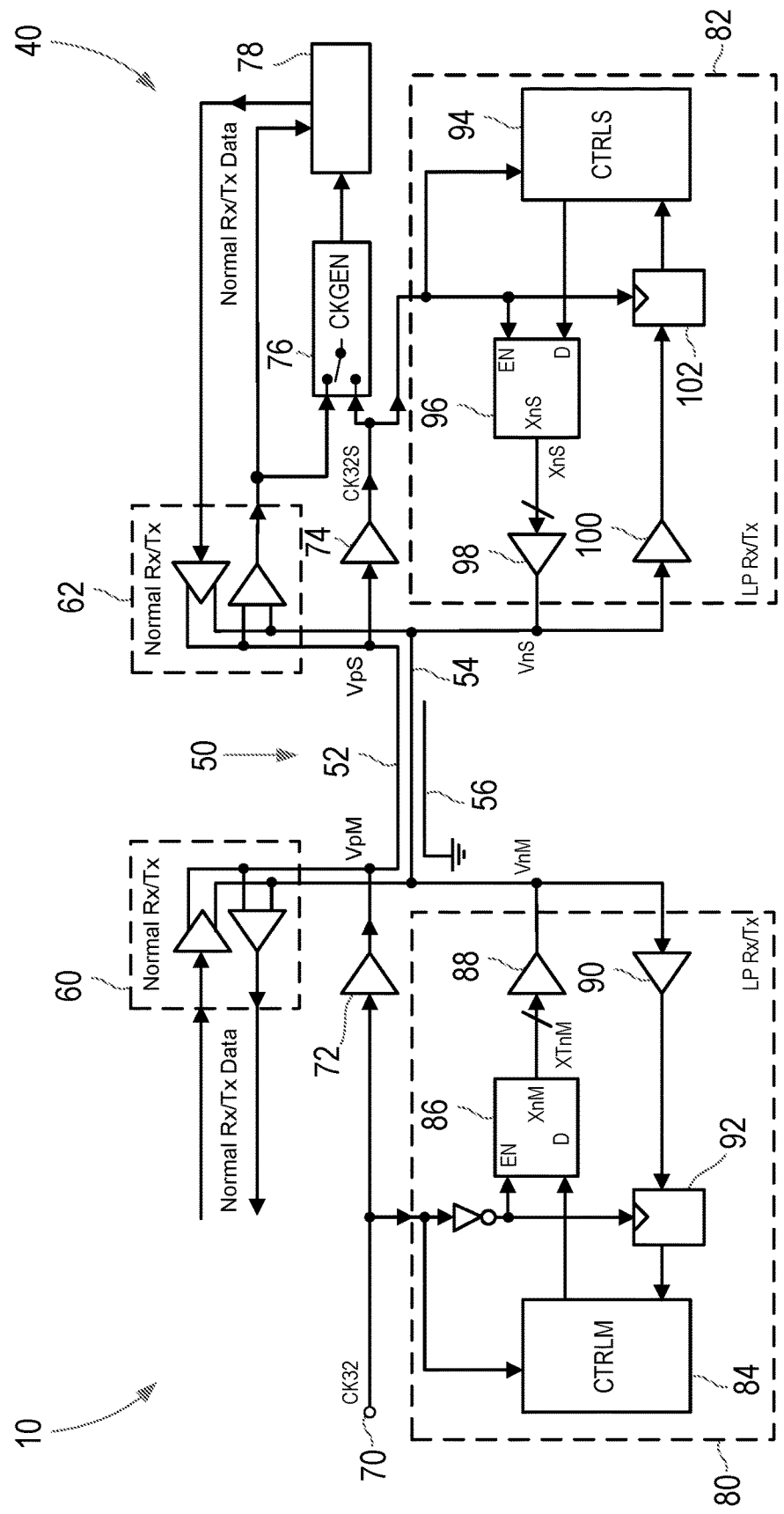
FIG. 2 shows in more detail parts of the system of FIG. 1.

FIG. 2 is a schematic diagram, illustrating the general form of a system in accordance with one embodiment. In this example, a host, or master, device 10 and an accessory device 40 are connected by a bus 50. The accessory device may for example be a component of a larger accessory product (such as a microphone in a product such as a pair of earphones as shown in FIG. 1) that is detachable from the product containing the host device. In such embodiments, for example those comprising USB Type-C connectors as discussed above, the bus 50 may be detachable from one or both of the host device or the accessory. Alternatively, the accessory may be a component in a larger product that also contains the host device (such as a microphone in a laptop computer). In such embodiments, the bus 50 may connect the master module and a slave module. The bus may therefore extend along an external cable, or may be included within a housing of a product such as a laptop or tablet computer, television, etc.

The bus 50 is configured for transmitting differential signals in the normal mode of operation, and has a positive signal line 52, a negative signal line 54, and an earth line 56.

The voltage at the master end of the positive signal line is referred to as VpM, and the voltage at the slave end of the positive signal line is referred to as VpS. The voltage at the master end of the negative signal line is referred to as VnM, and the voltage at the slave end of the negative signal line is referred to as VnS.

The host device 10 contains a module having circuitry 60 for transmitting and receiving data on the bus 50 during normal bus operation, and the accessory device 20 contains a module having circuitry 62 for transmitting and receiving data on the bus 50 during normal bus operation. The bus 50 is configured for differential operation. That is, when transmitting a data bit having a first value, a more positive voltage is applied to the positive signal line 52 and a more negative voltage is applied to the negative signal line 54. Conversely, when transmitting a data bit having a second value, a more negative voltage is applied to the positive signal line 52 and a more positive voltage is applied to the negative signal line 54. These more positive and more negative voltages are preferably symmetric about a fixed common-mode voltage, which may be zero or more commonly some non-zero voltage more positive or possibly more negative than ground.

The circuitry for use during the low power mode of operation will now be described in more detail.

The host module generates or receives a clock signal CK32 at a node 70, which can have any convenient frequency, but in this illustrated embodiment is at a frequency of 32 kHz. Where the system has a higher power mode of operation, the clock signal CK32 may be at a significantly lower frequency than the frequency of a clock signal that is applied to the bus during that higher power mode of operation. For example, a clock signal that is applied to the bus during that higher power mode of operation could have a frequency of, say, 48 MHz. In the illustrated embodiment, the clock source 70 is provided in the host, or master, device. However, it is also possible for the clock signal to be applied to the bus from a device that would more generally be regarded as a slave device for other purposes.

The source 70 of the clock signal CK32 is connected through a buffer 72 to the positive signal line 52 of the bus 50. Thus, the positive signal line 52 is constantly actively driven by the host with a digital 32 kHz clock signal. The clock signal may have a nominal 50% duty cycle and provides the accessory device 40 with a 32 kHz clock reference.

Thus, the module in the accessory device has a buffer 74 connected to the positive signal line 52, and this is connected to a clock generator block 76. This clock generator block may generate a higher frequency clock or clocks required for other operational circuitry 78 of the accessory device, in order to allow the accessory device to continue operation in the low power mode. In a higher power mode if present, the clock generation may be performed based on a clock recovered from clock information received from the data bus, possibly embedded in a data stream. Examples of operational circuitry that might require the generated clock include delta-sigma ADCs or digital microphones or delta-sigma DACs or Class D power amplifiers. In some embodiments the generated clock may be the same in both low power and higher power modes, in other cases a lower clock frequency may be used in the low power mode to give lower power consumption by the operational circuitry, possibly at the expense of performance parametrics. For instance a digital microphone may operate with a relatively high clock frequency in the higher power mode when recording music, but with a lower clock frequency and lower resolution if just monitoring for the presence or absence of a voice signal.

The module in the host device 10 also includes circuitry 80 for transmitting and receiving data on the negative signal line 54 of the bus, and the accessory device 40 includes circuitry 82 for transmitting and receiving data on the negative signal line 54.

Specifically, the circuitry 80 includes a controller 84, for generating data to be transmitted and for handling received data. Data to be transmitted is passed through a buffer controller 86 and an output buffer 88 through a terminal to the negative signal line 54 of the bus 50. Received data is passed through the same terminal to an input buffer 90 and a latch 92, and then to the controller 84.

The clock signal CK32 is passed to the controller 84, and is also used to enable the buffer 88 via the buffer controller 86 and to sample the buffered input signal with the latch 92 during different respective time periods, as described below, so that the host module is only transmitting or receiving at any given time.

The circuitry 82 in the accessory includes a controller 94, for generating data to be transmitted and for handling received data. Data to be transmitted is passed through a buffer controller 96 and an output buffer 98 to a terminal on the negative signal line 54 of the bus 50. Received data is passed through the same terminal to an input buffer 100 and a latch 102 and then to the controller 94.

The received clock signal CK32S is passed to the controller 94, and is also used to enable the buffer 98 via the buffer controller 96 and to sample the buffered input signal with the latch 102 during different respective time periods, as described below, so that the accessory module is only transmitting or receiving at any given time.

As mentioned above, the host module and the accessory module are able to write data to the negative signal line 54 of the bus 50 during different respective time periods. In this example, these time periods are defined by the clock signal CK32 on the positive signal line 52 of the bus 50.

Specifically, in this example, the host module owns, i.e. drives, the negative signal line 54 during the phase at which the clock signal on the positive signal line is Low, and it does not drive the line (i.e. its output is High-Impedance) when the clock signal on the positive signal line is High.

The accessory owns, i.e. drives, the negative signal line 54 when the clock signal on the positive signal line is at its High phase, and the accessory does not drive the line (i.e. its output is High-Impedance) when the positive signal line is Low.

During the successive periods when the accessory owns the negative signal line 54, that is, during successive High phases of the clock signal CK32S that it receives on the positive signal line 52, the accessory writes a code sequence on the negative signal line.

In this illustrated example, a 7 bit Barker code is used, namely [1,1,1,0,0,1,0], of which the leftmost bit is the first bit. However, the bit patterns to be sent by the accessory module and the host module can take any suitable form. In particular embodiments, other pre-arranged code sequences can be used.

In the illustrated embodiment, the encoding of this sequence is simple. A logic high signal level on the bus is associated with a '1' in the code, and a logic low signal level on the bus is associated with a '0' in the code. As a consequence the chosen code provides a very distinctive signature on the line, with suitable spectral characteristics, allowing the host to detect reliably that the accessory module is present (as far as is possible with an unbiased binary detector) despite other phenomena on the bus such as any external uncorrelated interference.

Next to that it is convenient to be able to consider multiple code bits as a single data word such that this data word can be used to convey the Wake Up request and the Wake Up Command with greater reliability than merely transmitting a single data bit.

The host module receives the code sequence transmitted by the accessory during the High phase of the clock signal. Specifically, the host module may sample the signal on the negative signal line at the moment that it starts driving the falling clock edge on the positive signal line.

The host module then synchronizes an internal Barker code generator to the incoming data.

In this low-power mode of operation, the host module transmits the bit value generated by its internal Barker code generator during the periods when the host owns the negative signal line, that is, during the Low phase of the clock signal CK32. Thus, in the absence of transmission bit errors, and when the host module is not signalling, it drives the same bit from the Barker code as the one just received from the accessory during the preceding high clock phase.

Figure 3:
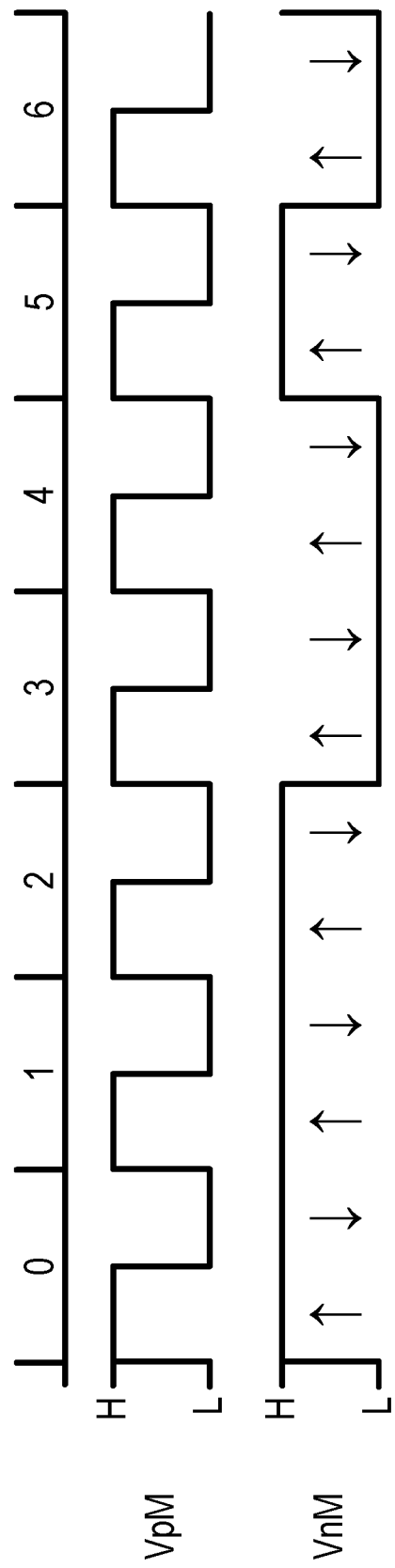
FIG. 3 illustrates signals in the system of FIG. 2.

FIG. 3 illustrates the signals on the lines 52, 54 of the bus during this operation. In particular, FIG. 3 shows voltages VpM and VnM at the master end of the positive and negative signal lines 52, 54, ignoring for now the time taken for clock or data signals to travel from one end of the bus to the other. Specifically, FIG. 3 shows the signals during seven periods, numbered 0-6, of the clock signal CK32. This clock signal is driven by the host module onto the positive signal line 52.

While the clock signal on the positive signal line is high (H), the slave module transmits either a high (H) or low (L) value on the negative signal line up to the master, as indicated by the upwards arrows T. While the clock signal on the positive signal line is low (L), the master module transmits either a high (H) or low (L) value on the negative signal line down to the slave, as indicated by the downwards arrows ↓. In this illustrated situation, the value transmitted by the master module repeats the value transmitted by the slave module in the immediately preceding half period of the clock signal CK32.

However, in this case, even when there are bit errors on the line, and the host module receives a bit value that is not part of the expected Barker code sequence, the host may be configured to still drive the bit value generated by its internal Barker code generator until it has either detected a predetermined number of bit errors in a given time, thus desensitizing the operation to occasional bit errors.

Figure 4:
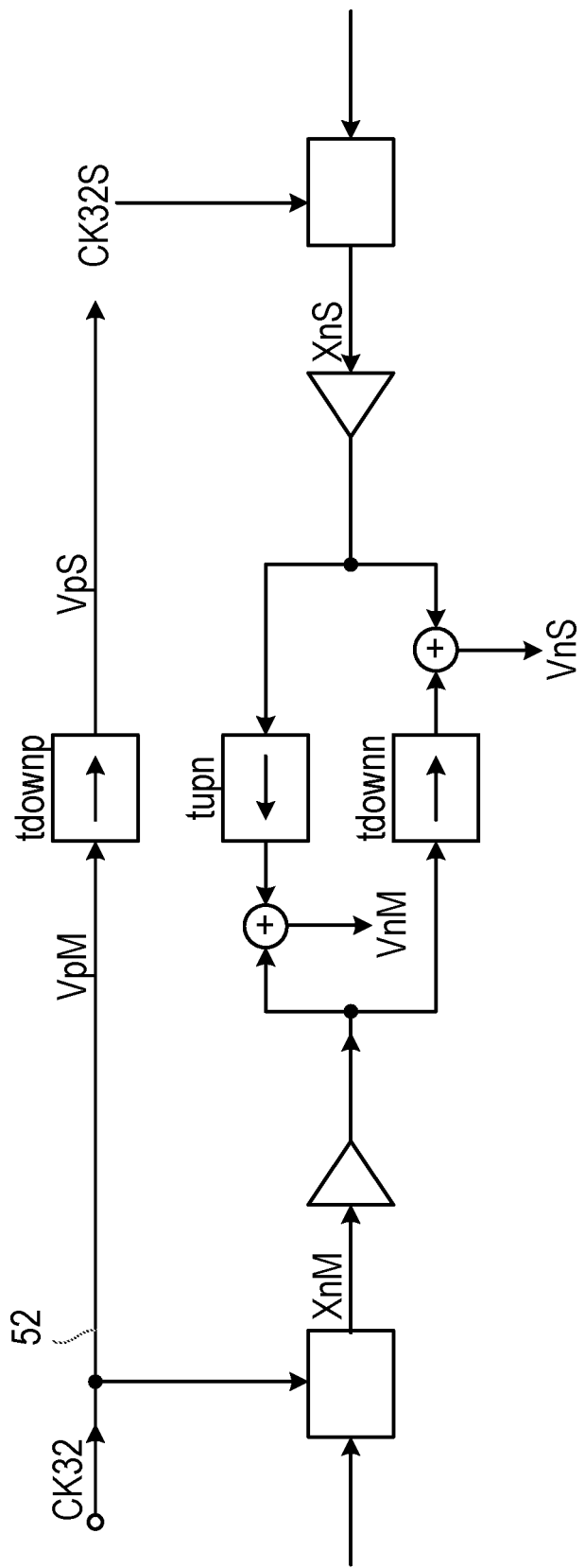
FIG. 4 illustrates the operation of the system of FIG. 2.

FIG. 4 is a schematic illustration of the signals on the bus lines. Thus, the clock CK32 is driven onto the positive signal line 52 by the master module as voltage VpM at the master end of the line at all times. This appears at the slave end of the line delayed by an amount tdownp as voltage Vps providing a local, delayed, copy CK32S of the clock CK32.

At the master end of the line, data is driven onto the line in clock half-periods defined by CK32 via the intermediate buffer controller output signal XnM. At the slave end of the line, data is driven onto the line in clock half-periods defined by the delayed version of this clock, CK32S, via the intermediate buffer controller output signal XnS.

At the master end of the line the data from the master in one half clock period defined by CK32 is combined with data transmitted up from the slave in the other half-period of the clock CK32S delayed by tdownp with respect to CK32 and subjected to a further transmission delay tupn.

Similarly at the slave end of the line, data transmitted from the master in the one half-period of the clock CK32S delayed by tdownp with respect to CK32 is combined with data transmitted from the master, originally aligned to the clock CK32, but delayed in transmission by an amount tdownn, Thus, assuming all these transmission delays tdownp and tdownn are equal, and neglecting any other delays, data appears at the slave end in alternate half clock periods of the delayed clock CK32S driven by master and slave. On the other hand, data appears at the master in one half clock period aligned to CK32 driven from the master but in the other half clock period driven from the slave delayed by two transmission delays, tdownp and tupn.

Figure 5:
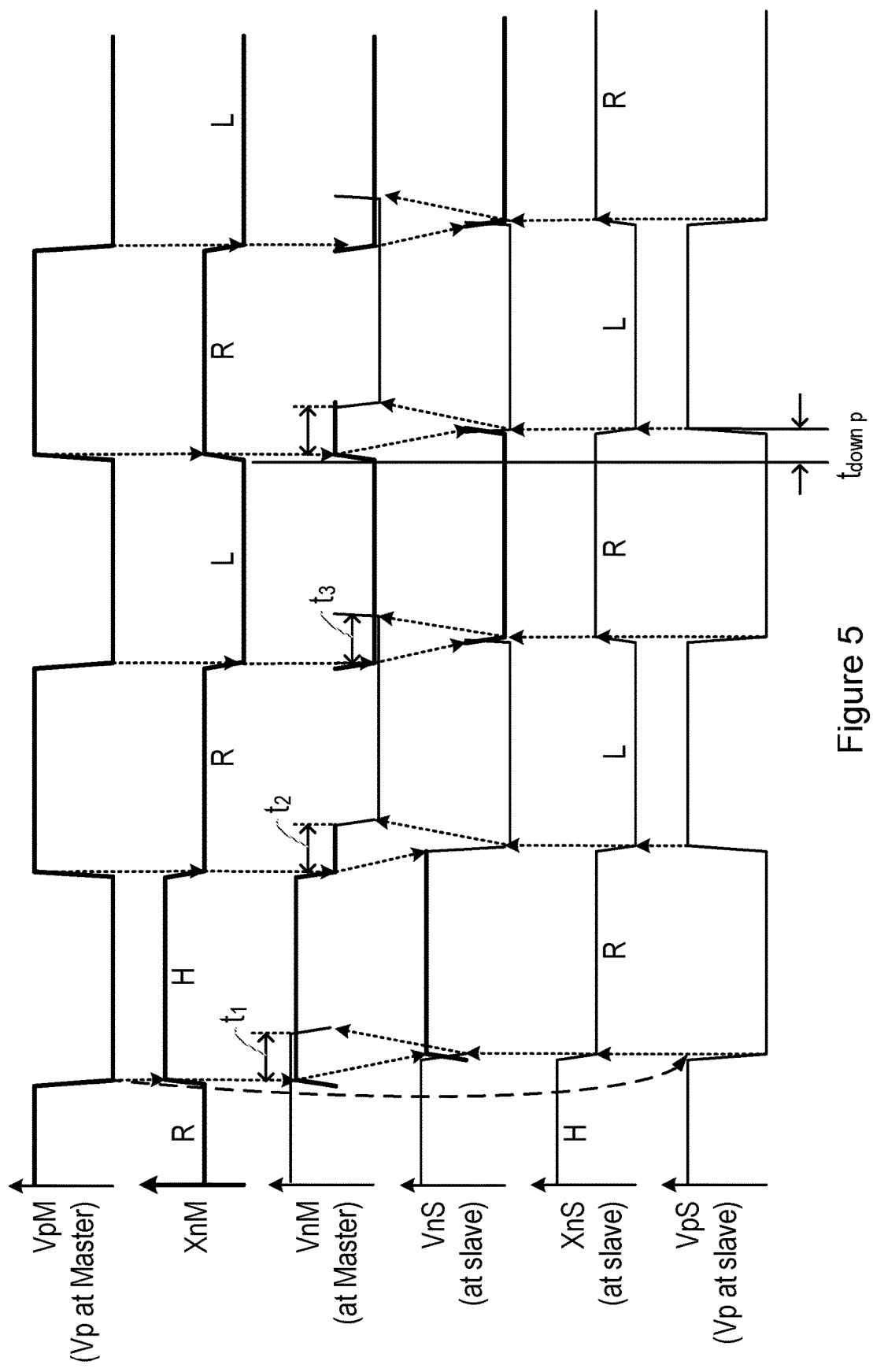
FIG. 5 illustrates in more detail signals in the system of FIG. 2.

FIG. 5 is a timing diagram, illustrating these signals as waveforms. It will be noted that FIG. 5 shows a finite transition time between high and low levels of the clock. Specifically, FIG. 5 shows the signal VpM, namely the clock signal that is driven onto the positive signal line at all times.

FIG. 5 also shows the signal VpS, namely the value detected by the slave module on the positive signal line. This corresponds to the clock signal that is driven onto the positive signal line by the master module, but it is received by the slave module after a finite bus transit time tdownp.

FIG. 5 also shows the buffer control signal XnS that is used to control the actual output buffer driver of the slave. This is illustrated as a three-level signal, though in actual implementation it is likely to be two or more binary signals driving elements of the driver circuitry according to the detailed design of this circuitry. When XnS is high (H) this instructs the driver to drive a logic high onto its output. When XnS is low (L) this instructs the driver to drive a logic low onto its output. The third state, R, of XnS instructs the driver to go high impedance, i.e. not to drive any signal onto its output.

During periods when VpS is high, XnS can be either high (H) or low (L), depending on the current code value to be transmitted. During periods when VpS is low, XnS enters the third, R, state, illustrated in FIG. 5 as a level R intermediate between the H and L levels.

FIG. 5 also shows the similar buffer control signal XnM that is used to control the actual output buffer driver of the master. This is illustrated as a three-level signal, though in actual implementation it is likely to be two or more binary signals driving elements of the driver circuitry according to the detailed design of this circuitry. When XnM is high (H) this instructs the driver to drive a logic high onto its output. When XnM is low (L) this instructs the driver to drive a logic low onto its output. The third state, R, of XnM instructs the driver to go high impedance, i.e. not to drive any signal onto its output.

During periods when VpM is low, XnM can be either high (H) or low (L), depending on the value to be transmitted. As discussed above, the value to be transmitted during these periods is derived from a Barker code generator in the master, suitably synchronized to data patterns received from the slave by the master such that the value to be transmitted in each half-period is equal to the value XnS transmitted by the slave module during the immediately preceding half-period of the clock signal. During periods when VpM is high, XnM enters the third, R, state, illustrated in FIG. 5 as a value R intermediate between the H and L levels.

FIG. 5 then also shows the signals VnM and VnS, at the master and slave ends respectively of the negative signal line, that result from the signals driven on to the bus by the master and slave modules. The resulting voltage of these signals are a combination of the effects of the master and slave driver states, with the added effects of the various transmission line delays.

In the waveforms shown, initially both VpM and VpS are high. XnM is thus in state R and the master output buffer is not driving the line. XnS is High, so the slave output driver is driving a high level onto the line, observable at both VnS and VnM.

When VpM (CK32) goes low, XnM goes into an active state, in this case H, corresponding to the high level previously detectable on VnM. The master output driver then actively pulls VnM high, as illustrated by the heavier and slightly lower drawn line. This has little observable effect, since VnM was already high.

Meanwhile the clock edge on VpM has propagated with a delay tdownp to Vps, causing XnS to enter the R state and disable the slave output driver. However until this instant the slave output driver has still been driving the line, as illustrated by the higher and fainter line at this point, and allowing for the transmission line delay tupn would still effectively drive the master end of the line for a further time tupn.

Thus for a duration shown as t1, equal to tdownp+tupn, both drivers effectively drive VnM high.

At the slave end of the line, the line is driven high by the slave driver for a time tdownp during the propagation of the clock signal down the positive signal line. This driver then goes high-impedance. Meanwhile the master output driver starts to actively drive VnM high on the falling edge of VpM, but it only affects the slave end of the line after a propagation delay tdownn. If tdownn equals tdownp (as is likely, as these are two wires of a symmetric differential transmission line) then these two events occur simultaneously.

Similarly on the rising edge, the events at the slave end are still simultaneous, but now the overlap t2, again equal to tdownp+tupN, is an overlap of high-impedance states of the drivers, so VnM is not driven for a time duration t2. This is illustrated as a mid-level voltage, but in practice the voltage on the line may maintain its previous voltage due to the capacitance of the line until actively driven. In this example XnS has changed from H to L this clock period, so VnM (and VnS) change from a logic high level to a logic low level. Because of the underlap period there is no time that the master and slave drivers are attempting to drive the same end of the line to opposite logic levels.

Thus by this configuration of the relative clock delays and by designing the master to normally follow the slave in output logic level, there is no contention between the drivers despite the effects of transmission line delay.

In other words, the advantage of this scheme is that the host, which will always be the first party on the bus to start driving, as it generates the clock and all events on the bus are a consequence of a clock event, will by default drive the same value on the bus, as the value that is already present. As a consequence it can be guaranteed that, although the transit time of the signals means that there will be an offset between the clocks at the two ends of the bus, during the phase at which the two sides are both driving the bus (for example $t_1$ and $t_3$ in FIG. 5) there is no current driven in opposite directions. Current driven in opposite directions would inherently have led to inefficiency in power consumption and emissions from the cable.

Similarly when the accessory starts driving the negative signal line of the bus, it will only do this once the rising clock edge has reached it. At this time, the driver on the host side will already have stopped driving (as indicated at $t_2$ in FIG. 5). So, even when the host and accessory in subsequent phases write a different logic value on the bus, it is guaranteed that there is no drive conflict on the bus, and this is achieved without complex timing mechanisms.

In this illustrated embodiment, as described in more detail below, the host module and the accessory module are each able to send information on the bus by altering the pattern of the signals as described above.

Specifically, in this illustrated embodiment in which the accessory has a normal mode of operation and a low power mode of operation, with the signals described above being used in the low power mode, one alteration of the pattern can be used by the host module as a wakeup command to the accessory, and another alteration of the pattern can be used by the accessory to send a wake up request to the host.

Figure 6:
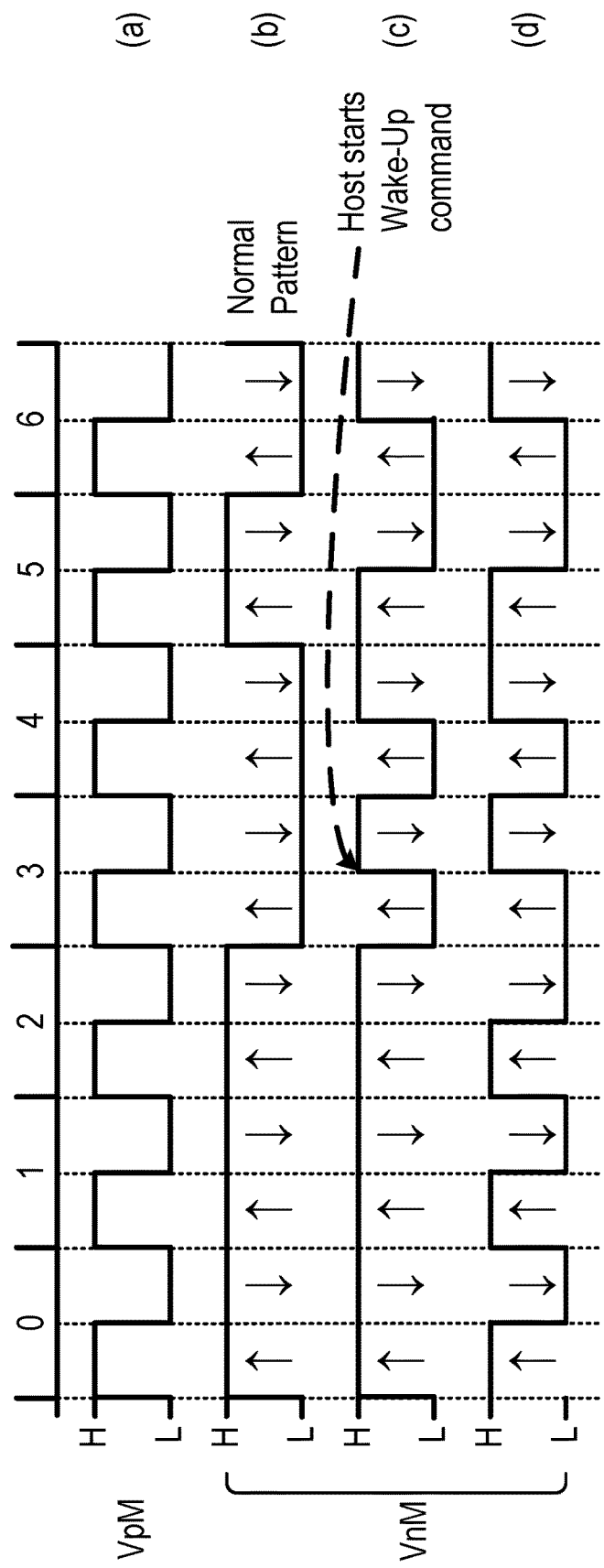
FIG. 6 is a further illustration of signals in the system.

FIG. 6 is a timing diagram, illustrating the signals on the lines 52, 54 of the bus during a period when the host module alters the pattern of signals to send a wake up command to the accessory.

In particular, FIG. 6 shows voltages VpM and VnM at the master end of the positive and negative signal lines 52, 54, ignoring the time taken for signals to travel from one end of the bus to the other. Specifically, FIG. 6, view (a) shows the voltage VpM during seven periods, numbered 0-6, of the clock signal CK32. This clock signal is driven by the host module onto the positive signal line 52, and the illustrated pattern is repeated in each block of seven periods, numbered 0-6, of the clock signal CK32.

FIG. 6, views (b), (c) and (d), show the voltage VnM on the negative signal line of the bus during three consecutive blocks of seven periods of the clock signal CK32.

FIG. 6, view (b) shows the situation in the first block of seven clock periods, during which, as described with reference to FIG. 3, while the clock signal on the positive signal line is high (H), the slave module transmits either a high (H) or low (L) value on the negative signal line up to the master, as indicated by the upwards arrows ↑. While the clock signal on the positive signal line is low (H), the master module transmits either a high (H) or low (L) value on the negative signal line down to the slave, as indicated by the downwards arrows ↓. During this block, the Barker code value transmitted by the master module is equal to the value transmitted by the slave module in the immediately preceding half period of the clock signal CK32.

In order to signal a Wake Up Command to the accessory, the host inverts the 7 bit Barker code. In this embodiment, the host is only permitted to start signaling this Command at bit-slot 3 of the 7-bit Barker code.

Thus, FIG. 6, view (c) shows the situation in the second block of seven clock periods. As before, while the clock signal on the positive signal line is high (H), the slave module transmits either a high (H) or low (L) value on the negative signal line, as indicated by the upwards arrows ↑. While the clock signal on the positive signal line is low (H), the master module transmits either a high (H) or low (L) value on the negative signal line, as indicated by the downwards arrows ↓.

During clock periods 0-2 of this second block, the value transmitted by the master module is still equal to the value transmitted by the slave module in the immediately preceding half period of the clock signal CK32.

However, during clock period 3, the host starts the Wake Up Command and, during clock periods 3-6 of this second block, the value transmitted by the master module is opposite to the value transmitted by the slave module in the immediately preceding half period of the clock signal CK32.

FIG. 6, view (d) shows the situation in the third block of seven clock periods. As before, while the clock signal on the positive signal line is high (H), the slave module transmits either a high (H) or low (L) value on the negative signal line, as indicated by the upwards arrows ↑. While the clock signal on the positive signal line is low (H), the master module transmits either a high (H) or low (L) value on the negative signal line, as indicated by the downwards arrows ↓.

In this case, the value transmitted by the master module is the opposite of the value transmitted by the slave module in the immediately preceding half period of the clock signal CK32.

The nominal transition from the low power mode to normal operation takes place in both the master module and the slave module at the end of the code sequence shown in FIG. 6(*d*).

The fixed grid of the multi-bit code sequences and the fixed positions for changing the code allows the accessory and the host to prepare responses, or to perform the transition from the low power mode to the active mode, without being sensitive to single bit errors.

Figure 7:
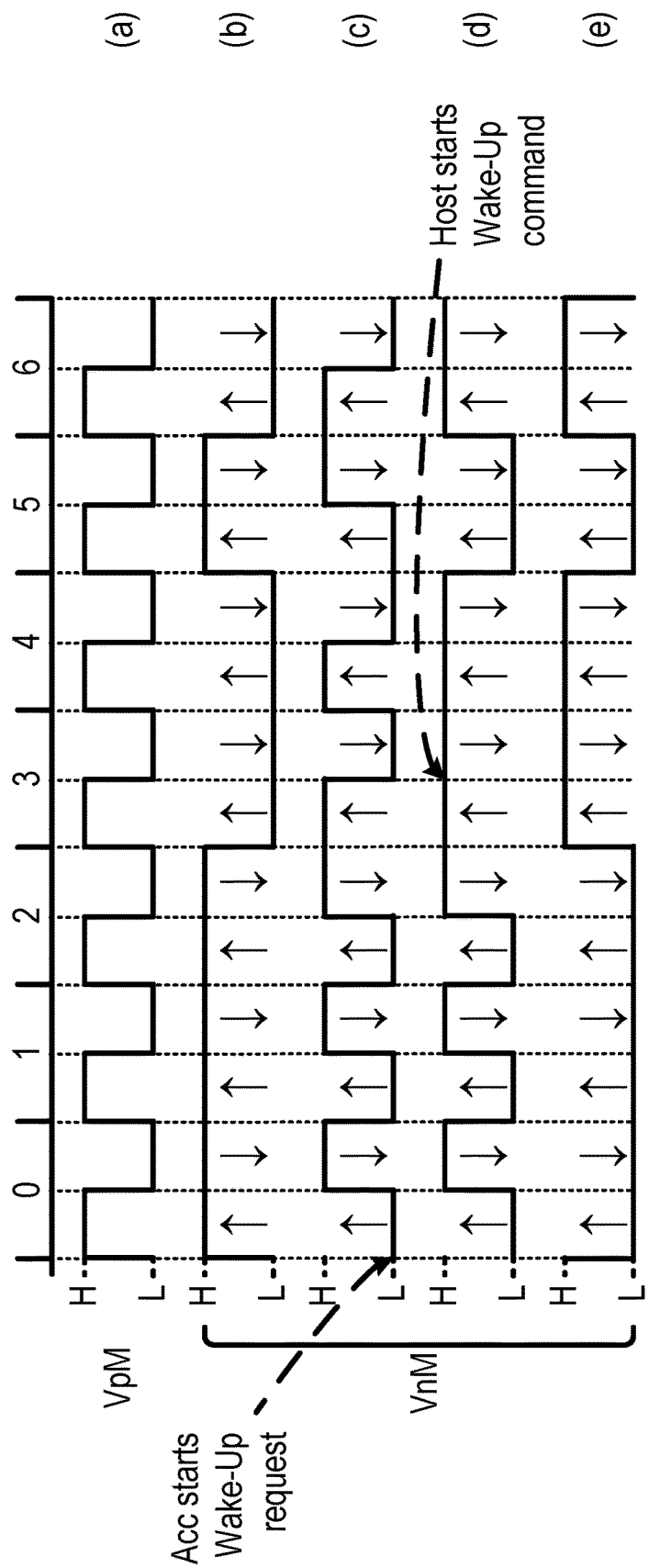
FIG. 7 is a further illustration of signals in the system.

FIG. 7 is a timing diagram, illustrating the signals on the lines 52, 54 of the bus during a period when the accessory module alters the pattern of signals to send a wake up request to the host.

In particular, FIG. 7 shows voltages VpM and VnM at the master end of the positive and negative signal lines 52, 54, ignoring the time taken for signals to travel from one end of the bus to the other. Specifically, FIG. 7, view (a) shows the voltage VpM during seven periods, numbered 0-6, of the clock signal CK32. This clock signal is driven by the host module onto the positive signal line 52, and the illustrated pattern is repeated in each block of seven periods, numbered 0-6, of the clock signal CK32.

FIG. 7, views (b), (c), (d) and (e) show the voltage VnM on the negative signal line of the bus during four consecutive blocks of seven periods of the clock signal CK32.

FIG. 7, view (b) shows the situation in the first block of seven clock periods, during which, as described with reference to FIG. 3, while the clock signal on the positive signal line is high (H), the slave module transmits either a high (H) or low (L) value on the negative signal line, as indicated by the upwards arrows ↑. While the clock signal on the positive signal line is low (H), the master module transmits either a high (H) or low (L) value on the negative signal line, as indicated by the downwards arrows ↓. During this block, the value transmitted by the master module is equal to the value transmitted by the slave module in the immediately preceding half period of the clock signal CK32.

In this illustrated embodiment, in order to signal a Wake Up Request to the host, the accessory inverts the 7 bit Barker Code. In this embodiment, the accessory can only start signaling this Request at the start of the 7-bit code sequence.

It will thus be noted that, in the illustrated embodiment, the starting points of the alterations relative to the start of a 7-bit code sequence performed by the host and by the accessory are offset by 3½ bit positions, that is, exactly one half of the 7-bit code sequence.

Thus, FIG. 7, view (c) shows the situation in the second block of seven clock periods. As before, while the clock signal on the positive signal line is high (H), the slave module transmits either a high (H) or low (L) value on the negative signal line, as indicated by the upwards arrows ↑. While the clock signal on the positive signal line is low (H), the master module transmits either a high (H) or low (L) value on the negative signal line, as indicated by the downwards arrows ↓.

Starting at the start of this second block, the accessory starts the Wake Up Request. Therefore, during the second block, the value transmitted during the first half of each clock period of the clock CK32 is the opposite of the value indicated by the Barker code.

During the second block, in this embodiment, the master module takes no action, and it continues to transmit the signals generated by its own Barker code generator. This is to desensitize to bit errors that might falsely signal a mode transition. Thus, during the second block (FIG. 7, view (c)) and clock periods 0-2 of the third block (FIG. 7, view (d)), the value transmitted by the master module is equal to the opposite of the value transmitted by the slave module in the immediately preceding half period of the clock signal CK32.

In response to the Wake Up Request, that has now persisted for more than a single cycle of the Barker code, unless overridden by some other control in the system, the master module transmits a Wake Up Command, as described above. Thus, starting during clock period 3 of the third block, the host starts to transmit signals that are the inverse of the signals generated by its own Barker code generator.

Therefore, during clock periods 3-6 of the third block, and throughout the fourth block, as shown in FIG. 7, view (e), the value transmitted by the master module is again equal to the value transmitted by the slave module in the immediately preceding half period of the clock signal CK32.

The nominal transition from the low power mode to normal operation takes place in both the master module and the slave module at the end of the code sequence shown in FIG. 7, view (e).

Thus, in this example, the actual transition from low power mode to normal operation only occurs as a consequence of the Wake Up Command as issued by the host. The Wake Up Request from the accessory is only a signal for the Host, and it is up to the host to decide if and when to agree to the request. There is no specific response from the accessory to the host in response to the Wake Up Command. Rather, it is assumed by the host that the accessory will indeed transition to the normal operation mode after receiving the Wake Up Command. Any failure to transition may be detected by an error condition in later operation.

In the example illustrated above, in the low power mode, the accessory and the host module each transmits a respective pattern of bit values, and each sends information to the other by altering that respective pattern of bit values to a specific alternative pattern of bit values. More specifically, the accessory and the host module can each send information to the other by inverting the respective pattern of bit values.

This scheme can be extended to allow the master and slave to signal alternative messages, for example using rotated versions of the 7-bit Barker code and their respective complements (together 14 possible code sequences, minus the two assigned for default operation and the Wake Up Request and Command), with preservation of cross correlation properties, inherently preserving the resilience against bit errors.

A system such as this allows a wider range of information to be signalled. For example, each altered pattern of bit values can represent a particular button pressed on the accessory.

The plurality of possible signalling bit sequences may also be used to signal different modes of entry into and exit from low-power mode of operation. For example one pattern may command an immediate change to low-power mode, another pattern may request a provisional request to change to low-power mode, which is only executed on receipt of a further pattern from the host, possibly only when this further pattern is received within a defined time or defined number of clock cycles. This would provide a secure interlock to prevent accidental entry into low-power mode due to data errors or some software glitch.

Figure 8:
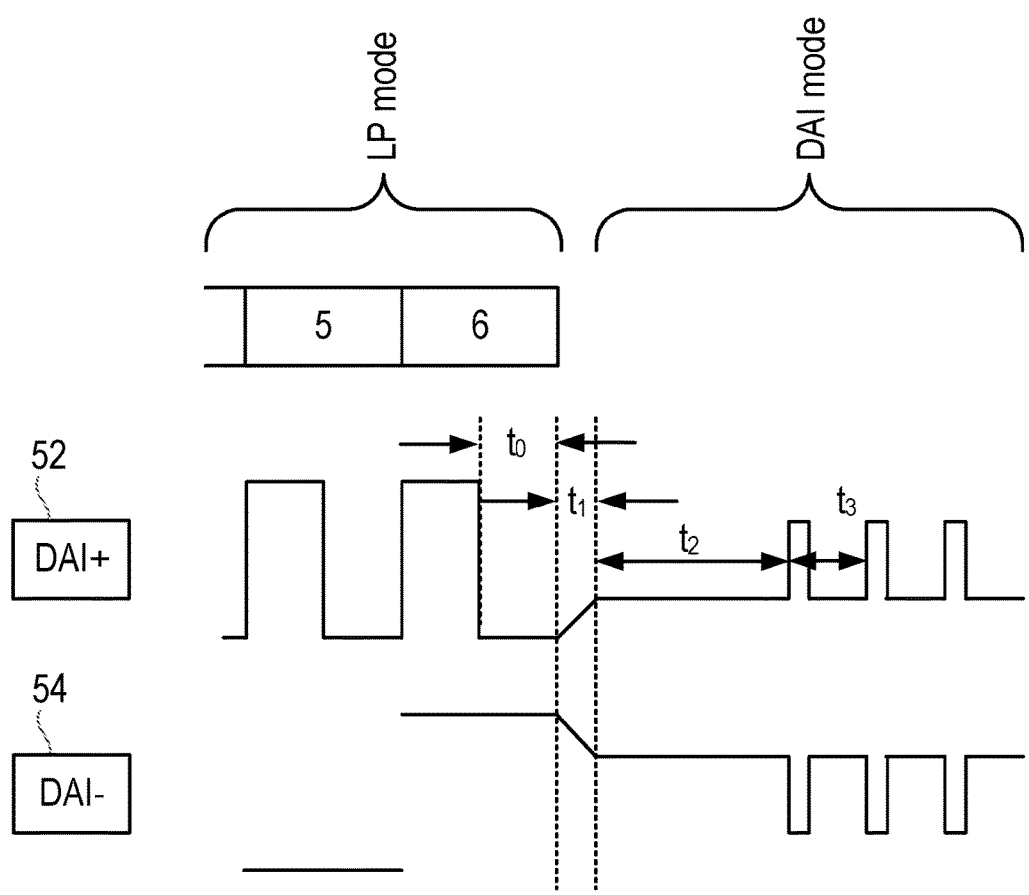
FIG. 8 is a further illustration of signals in the system.

In the case where the information transmitted by the altered pattern of bit values relates to the transition from a low-power mode of operation of an accessory to a normal or active mode (also referred to here as DAI mode), FIG. 8 illustrates this transition.

The system transitions from the low power mode to normal mode at the end of the Low clock phase of bit slot 6 in this code sequence as described above.

The accessory deactivates its LP output driver 98 on the detection of the falling clock edge on Vps in bit-slot 6 of the last code sequence in the LP mode, as it would normally, but then never re-activates it. In the last half clock-period the clock CK32 (actively reproduced by the master on the positive signal lines 52 (DAI+)) is low and therefore the master actively drives the negative signal line 54 (DAI−). In this half-period the Barker code value to be driven is always zero, so the master drives DAI− high.

Simultaneously on this edge, the master activates its normal DAI mode PHY to drive the line, driving a differential logic zero, i.e. driving DAI+ low and DAI− high.

When the master receives the last input clock edge it deactivates the drivers on both DAI+ and DAI−. Thus there is some overlap in drive for a period t0 of a half clock period.

After this overlap the signal lines are no longer driven to low power mode logic levels, so during a short time t1 they transition to differential-mode logic levels. This is performed without any change in polarity of the logic levels, avoiding any possibility of logic glitches.

The interface then commences normal operation with the start of the first frame signaled by a one symbol long pulse of the differential logic signal after some time t2, which may be less than a frame period or may be greater to allow time for some system initialization. The pulse is repeated once per frame period, and detected by the slave which then performs the first stages of synchronization and initialization as normal.

Figure 9:
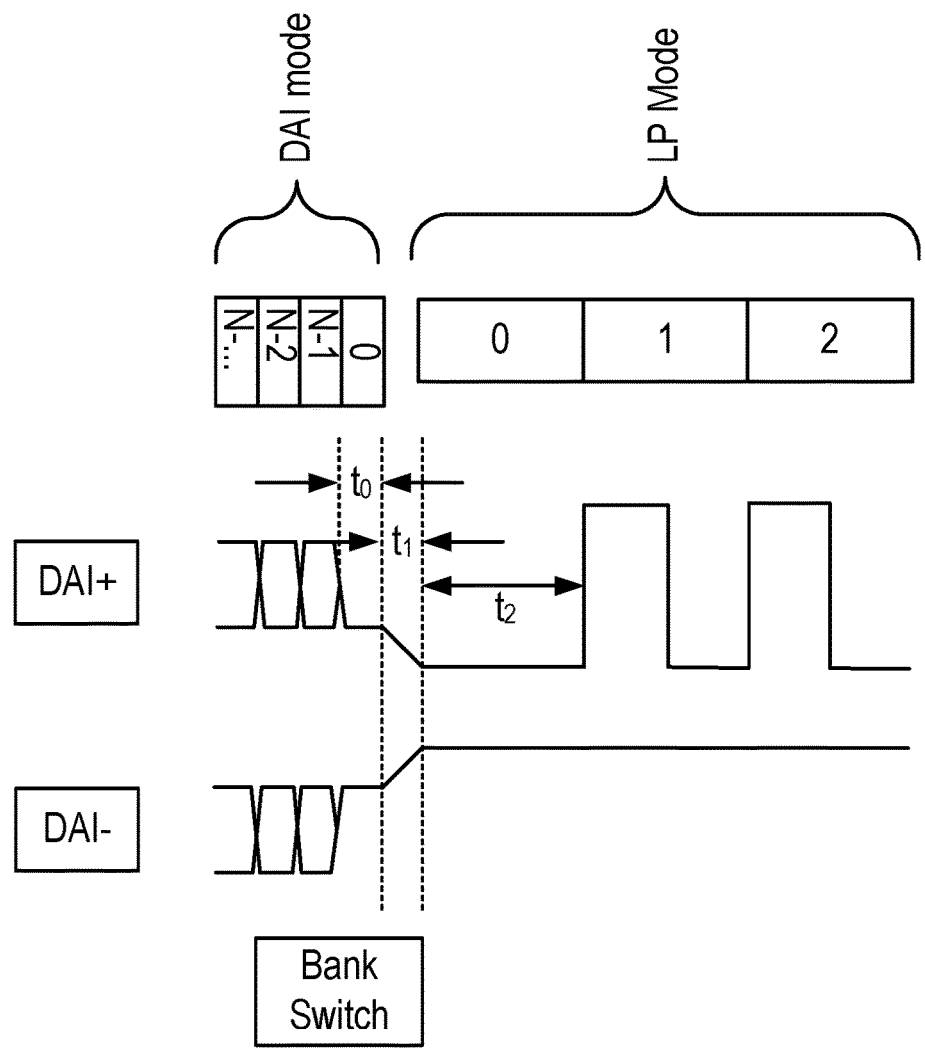
FIG. 9 is a further illustration of signals in the system.

FIG. 9 illustrates the transition from the normal mode to the low power mode.

Transition from Normal Mode to Low Power mode may be signaled by the host to the accessory through a register write across the bus from the master to a control register in the accessory module. This may be a banked register, i.e. the first register write may only have an operational effect after a further write command is received from the master across the bus. Thus the transition to the Low Power Mode happens at a well-defined moment.

The last symbol the host puts on the signal line, using the normal PHY may be the differential logic 0 of the Sync_0 symbol of the first symbol of the frame following the bank switch. Thus VpM (DAI−) will be driven to a low voltage and VnM (DAI+) to a high voltage in this bit period shown as a duration $t_0$.

To avoid glitches at the transition, the master low-power-mode driver may be activated at some point at the start or end or during this first symbol period to also drive VpM low and VnM high. These drivers will in general be driving to lower and higher voltages respectively, so there is no danger of a false logic level being received by either the normal or low-power mode receivers. The actual driver circuits may also be designed to allow this overdrive of the normal-mode driver outputs.

The duration of the overlap may be more than one symbol period, but the output of the normal mode drivers will be maintained as a differential 0 level, rather than transitioning to a differential-mode 1 as might be normal in the frame structure.

Thus during some interval $t_1$ the outputs will transition from the differential mode logic voltage levels to low-power mode logic voltage levels, but DAI− will remain a high voltage and DAI+ a low voltage throughout the transition.

After the normal mode driver is disabled, the master driver may be controlled to allow CK32 to be accepted and transmitted on the positive line of the bus. This clock, say 32 kHz, may be asynchronous to the end of a DAI mode frame, so there may be a delay $t_2$ before the first positive-going edge is received. It may be convenient to also allow one or a few cycles of CK32 for a clean initialization of the system. The first positive half-period of the clock transmitted on the positive signal line may be regarded as clock period number 1 of the Barker code cycle, in which case the slave will drive the negative line with a logic high for the clock periods 1 and 2 and then low in clock periods 3 and 4 as illustrated in previous figures. Until this first positive edge, the accessory driver is inactive and DAI− is driven by the master driver, as consistent with low power mode operation described above, which continues after this first positive edge.

Depending on the intended use, the entry into and exit from the low-power mode may be triggered either by the host device or by an accessory. For example, a microphone may comprise circuitry to detect whether received sound is likely to be voice or just background noise. The link may operate in the low-power mode unless a voice input is suspected. The microphone may comprise circuitry which may recognise a particular user or a particular trigger phrase. The microphone may be in an separate accessory detachably connected to a host device or may be in a slave module in a common housing to the master module to which it is connected, either detachably via edge connectors say or hard-wired by say solder connections.

FIG. 2 above illustrates an embodiment in which, in a normal mode, data may be transmitted from a host device or master 10 to an accessory device or slave 20, and a clock generator 76 in the slave may recover a clock from the signal received from the data bus 50. Thus there is no need for a separate signal line to convey a clock from the master to the slave. However there is a need for the clock generator capable of recovering a clock from the received data stream.

Figure 10:
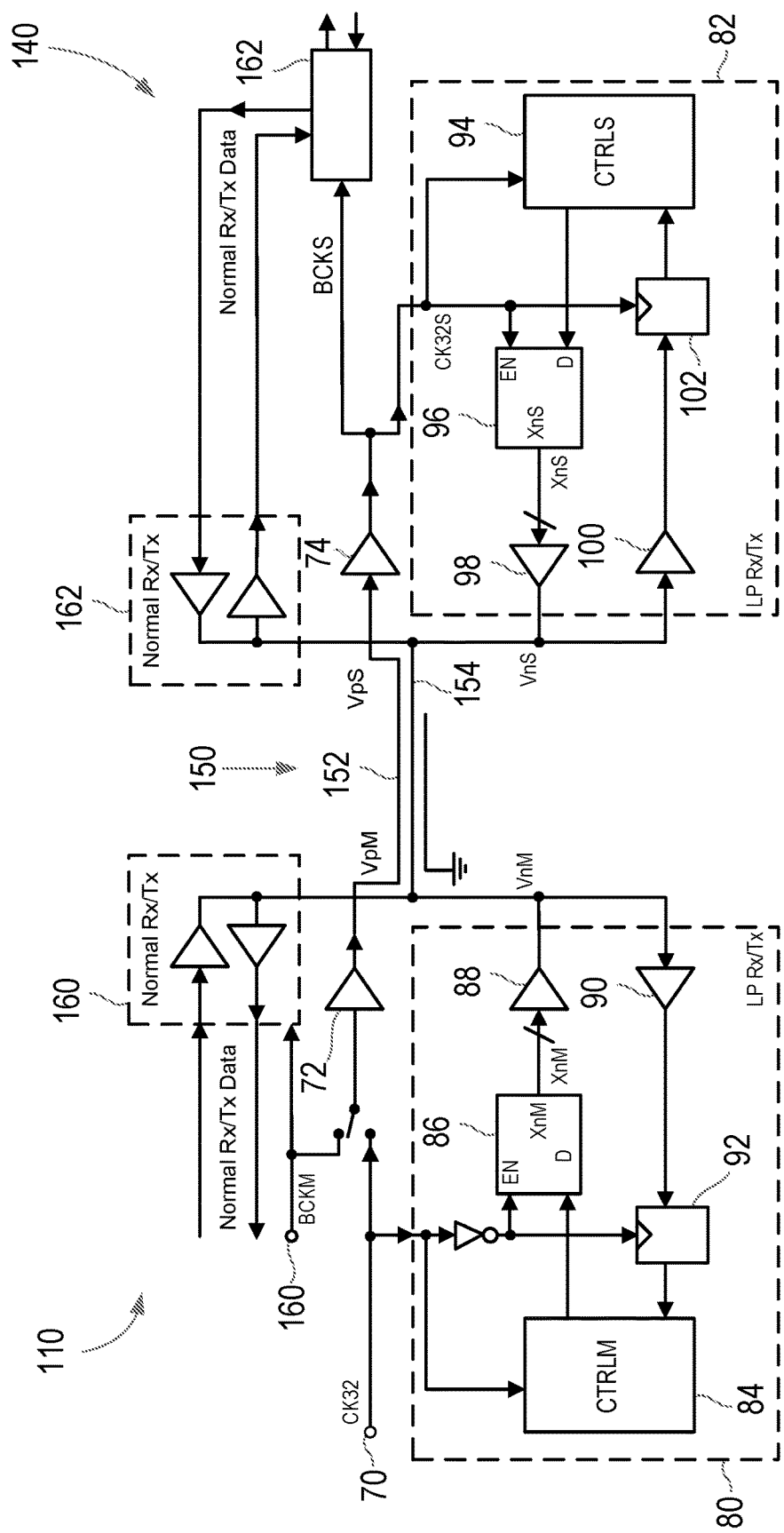
FIG. 10 shows in more detail parts of the system of FIG. 1, in an alternative embodiment.

FIG. 10 illustrates an alternative embodiment in which, in normal mode, a clock is transmitted on one signal line from the master to the slave, and may be used directly to sample incoming data or to transmit data on a second different signal line. Thus there is no need for a clock recovery circuit.

FIG. 10 is a schematic diagram, illustrating the general form of a system in accordance with this alternative embodiment. In this example, a host, or master, device 110 and an accessory device 140 are connected by a bus 150. As in the case of FIG. 2, the accessory device may for example be a component of a larger accessory product (such as a microphone in a product such as a pair of earphones as shown in FIG. 1) that is detachable from the product containing the host device. In such embodiments, for example those comprising USB Type-C connectors as discussed above, the bus 150 may be detachable from one or both of the host device or the accessory. Alternatively, the accessory may be a component in a larger product that also contains the host device (such as a microphone in a laptop computer). In such embodiments, the bus 150 may connect the master module and a slave module. The bus may therefore extend along an external cable, or may be included within a housing of a product such as a laptop or tablet computer, television, etc.

The system shown in FIG. 10 operates in a similar fashion to that of FIG. 2 in the low-power mode, and comprises similar components for use in the low-power mode.

The host module 110 generates or receives a clock signal CK32 at a node 70, which can have any convenient frequency, but in this illustrated embodiment is at a frequency of 32 kHz. Where the system has a higher power mode of operation, the clock signal CK32 may be at a significantly lower frequency than the frequency of a clock signal that is applied to the bus during that higher power mode of operation. For example, a clock signal that is applied to the bus during that higher power mode of operation could have a frequency of, say, 48 MHz. In the illustrated embodiment, the clock source 70 is provided in the host, or master, device. However, it is also possible for the clock signal to be applied to the bus from a device that would more generally be regarded as a slave device for other purposes.

The source 70 of the clock signal CK32 is connected through a buffer 72 to a first signal line 152 of the bus 150. Thus, the first signal line 152 is actively driven by the host during the low-power mode of operation with a digital 32 kHz clock signal. The clock signal may have a nominal 50% duty cycle and provides the accessory device 140 with a 32 kHz clock reference.

Thus, the module in the accessory device has a buffer 74 connected to the positive signal line 52.

The module in the host device 110 also includes circuitry 80 for transmitting and receiving data on a second signal line 154 of the bus, and the accessory device 140 includes circuitry 82 for transmitting and receiving data on the second signal line 154.

Specifically, the circuitry 80 includes a controller 84, for generating data to be transmitted and for handling received data. Data to be transmitted is passed through a buffer controller 86 and an output buffer 88 to a terminal connected to the second signal line 154 of the bus 150. Received data is passed through the same terminal to an input buffer 90 and a latch 92, and then to the controller 84.

The clock signal CK32 is passed to the controller 84, and is also used to enable the buffer 88 via the buffer controller 86 and to sample the buffered input signal with the latch 92 during different respective time periods, as described below, so that the host module is only transmitting or receiving at any given time.

The circuitry 82 in the accessory includes a controller 94, for generating data to be transmitted and for handling received data. Data to be transmitted is passed through a buffer controller 96 and an output buffer 98 to a terminal connected to the second signal line 154 of the bus 150. Received data is passed through the same terminal to an input buffer 100 and a latch 102, and then to the controller 94.

The received clock signal CK32S is passed to the controller 94, and is also used to enable the buffer 98 via the buffer controller 96 and to sample the buffered input signal with the latch 102 during different respective time periods, as described below, so that the accessory module is only transmitting or receiving at any given time.

Thus, the system shown in FIG. 10 has the same circuitry as the system shown in FIG. 2 for use in the low-power mode, and the operation of the two systems in the low-power mode is the same, as described with reference to some or all of FIGS. 3 to 9.

However, in the system of FIG. 10, in normal mode, the master 110 generates of receives on an input 160 a master bit clock BCKM, and drives that clock onto the first line 152 of the bus 150 via the driver 72. The clock signal is received at the slave 140 by the input clock buffer 74, which then provides a slave bit clock BCKS for other operational circuitry 162 of the slave device.

The second line 154 of the bus 150 is connected between master receive/transmit buffers 160 and slave transmit/receive buffer 162 which may pass data in either direction, for example using some half-duplex scheme. At the slave end of the bus, this data is received or generated by some of the operational circuitry 162 clocked by the clock BCKS.

The separate signal lines 152 and 154 are illustrated as single wires, and are connected to single-output or single-input buffers but in some embodiments either or both of these lines may comprise a pair of wires and be operated as a differential signal line, connected to differential-input or differential-output buffers.

The operational circuitry 162 may comprise some clock generation circuitry for providing clocks of different frequency or phase for use in other circuitry comprised in the block 162 or indeed elsewhere, but this clock generator will receive a data-independent input clock signal BCKS and thus be much simpler than a circuit which needs to extract a bit clock from sync pulses or sync patterns inserted periodically in a received data stream or which needs to extract a bit clock from a stream of continuous data.

Thus, the system shown in FIG. 10 allows clock and data signals to be transmitted on different lines of the bus 150 during the normal mode of operation.

There is thus described a system that in some embodiments allows information to be transferred across a bidirectional wired communication line with low power and/or low EMI.

For many applications embodiments of the invention will be implemented on a DSP (Digital Signal Processor), ASIC (Application Specific Integrated Circuit) or FPGA (Field Programmable Gate Array). Thus the code may comprise conventional program code or microcode or, for example code for setting up or controlling an ASIC or FPGA. The code may also comprise code for dynamically configuring re-configurable apparatus such as re-programmable logic gate arrays. Similarly the code may comprise code for a hardware description language such as Verilog™ or VHDL (Very high speed integrated circuit Hardware Description Language). As the skilled person will appreciate, the code may be distributed between a plurality of coupled components in communication with one another. Where appropriate, the embodiments may also be implemented using code running on a field-(re)programmable analogue array or similar module in order to configure analogue hardware.

Note that as used herein the term module shall be used to refer to a functional unit or block which may be implemented at least partly by dedicated hardware components such as custom defined circuitry and/or at least partly be implemented by one or more software processors or appropriate code running on a suitable general purpose processor or the like. A module may itself comprise other modules or functional units. A module may be provided by multiple components or sub-modules which need not be co-located and could be provided on different integrated circuits and/or running on different processors. A module may be implemented on a single integrated circuit.

Embodiments may be implemented in a host device, especially a portable and/or battery powered host device such as a mobile telephone, an audio player, a video player, a PDA, a mobile computing platform such as a laptop computer or tablet and/or a games device for example. Embodiments of the invention may also be implemented wholly or partially in accessories attachable to a host device, for example in active speakers or headsets or the like.

It should be noted that the above-mentioned embodiments illustrate rather than limit the invention, and that those skilled in the art will be able to design many alternative embodiments without departing from the scope of the appended claims. The word "comprising" does not exclude the presence of elements or steps other than those listed in a claim, "a" or "an" does not exclude a plurality, and a single feature or other unit may fulfil the functions of several units recited in the claims. Any reference numerals or labels in the claims shall not be construed so as to limit their scope. Terms such as amplify or gain include possibly applying a scaling factor of less than unity to a signal.

The invention claimed is:

1. A method of sending information between first and second modules connected by a signal bus, the method comprising:
    generating a clock signal in the first module, and imposing the clock signal on a first line of the signal bus;
    transmitting a first pattern of bit values from the second module to the first module on a second line of the signal bus, during first half-periods of each period of said clock signal; and
    transmitting a second pattern of bit values from the first module to the second module on the second line of the signal bus, during second half-periods of each period of said clock signal, wherein the second half-periods of each period of said clock signal are different from the first half-periods of each period of said clock signal;
    and the method further comprising at least one of:
    in order to transmit information from the first module to the second module, transmitting an altered second pattern of bit values; and
    in order to transmit information from the second module to the first module, transmitting an altered first pattern of bit values.

2. A method as claimed in claim 1, further comprising, in an alternative mode of operation, operating the signal bus as a differential signal bus, wherein the first and second lines of the signal bus operate as the positive signal line and the negative signal line of the differential signal bus.

3. A method as claimed in claim 1, wherein the second pattern of bit values is the same as the first pattern of bit values, such that transmitting the second pattern of bit values from the first module to the second module requires maintaining the signal level on the second line of the signal bus.

4. A method as claimed in claim 1, wherein the first pattern of bit values is a Barker code sequence.

5. A method as claimed in claim 1, wherein the second pattern of bit values is a Barker code sequence.

6. A method as claimed in claim 1, wherein the altered second pattern of bit values is the second pattern of bit values inverted.

7. A method as claimed in claim 1, wherein the altered first pattern of bit values is the first pattern of bit values inverted.

8. A method as claimed in claim 1, comprising performing the method in a low power mode of operation of the second module, wherein the second module is also operable in a normal mode.

9. A method as claimed in claim 8, comprising switching the second module to the normal mode of operation in response to the first module transmitting information to the second module by transmitting the altered second pattern of bit values.

10. A method as claimed in claim 9, comprising transmitting information from the first module to the second module by transmitting the altered second pattern of bit values, in response to the second module transmitting information to the first module by transmitting the altered first pattern of bit values.

11. A method as claimed in claim 1, wherein the first and second modules are provided in a single product.

12. A method as claimed in claim 1, wherein the first and second modules are provided in first and second devices, respectively, the first and second devices being connected by a wired connection.

13. A method as claimed in claim 12, wherein the second device is detachably connected to the first device.

14. A method as claimed in claim 13, wherein the first device is a host device, and the second device is an accessory device.

15. A host module configured to:
    generate a clock signal, and impose the clock signal on a first line of a signal bus;
    detect a first pattern of bit values transmitted on a second line of the signal bus, during first half-periods of each period of said clock signal;
    transmit a second pattern of bit values on the second line of the signal bus, during second half-periods of each period of said clock signal, wherein the second half-periods of each period of said clock signal are different from the first half-periods of each period of said clock signal; and being further configured to:
    in order to transmit information, to transmit an altered second pattern of bit values; and/or
    in order to receive information, to detect an altered first pattern of bit values;
    wherein the host module comprises:
    a clock output buffer to drive said clock signal onto a first terminal;
    an input buffer for receiving a data signal at a second terminal;
    controller circuitry for detecting the first pattern of bit values in the received data signal during the first half-periods of each period of said clock signal and generating the second pattern of bit values; and
    output buffer circuitry for driving the second pattern of bit values onto the second terminal during the second half-periods of each period of said clock signal;
    further wherein the controller circuitry is adapted to transmit said information by altering the second pattern of bit values; and to receive information by detecting said altered first pattern of bit values.

16. A host module as claimed in claim 15, wherein the second pattern of bit values is the same as the first pattern of bit values, such that transmitting the second pattern of bit values from the master module requires maintaining the signal level on the second terminal.

17. A host device, comprising a host module as claimed in claim 15.

18. A host device as claimed in claim 17, wherein the host device comprises an audio device.

19. A host device as claimed in claim 17, comprising a socket for enabling an accessory device, containing the second module, to connect thereto.

20. An integrated circuit comprising a host module as claimed in claim 15.

21. An accessory module configured to:

receive a clock signal on a first line of a signal bus;

transmit a first pattern of bit values on a second line of the signal bus, during first half-periods of each period of said clock signal;

receive a second pattern of bit values on the second line of the signal bus, during second half-periods of each period of said clock signal, wherein the second half-periods of each period of said clock signal are different from the first half-periods of each period of said clock signal; and being further configured:

in order to receive information, to detect an altered second pattern of bit values; and/or in order to transmit information, to transmit an altered first pattern of bit values;

wherein the accessory module comprises:

a clock input buffer to receive said clock signal at a first terminal;

an input buffer for receiving a data signal at a second terminal;

controller circuitry for detecting said second pattern of bit values in the received data signal during the second half-periods of each period of said clock signal and generating said first pattern of bit values; and output buffer circuitry for driving the first pattern of bit values onto the second terminal during the first half-periods of each period of said clock signal;

further wherein said controller circuitry is adapted to transmit the information by altering the first pattern of bit values; and to receive the information by detecting the altered second pattern of bit values.

22. An accessory module as claimed in claim 21, wherein the controller is adapted to detect the altered second pattern of bit values by detecting that a signal level received on the second terminal during a first half-period of a period of said clock signal has not been maintained from the signal level transmitted on the second terminal by the slave module in the second half-period of an immediately previous period of said clock signal.

23. An integrated circuit comprising an accessory module as claimed in claim 21.

24. An accessory device, comprising an accessory module as claimed in claim 21.

25. An accessory device as claimed in claim 24, comprising a plurality of second modules.

26. An accessory device as claimed in claim 24, comprising a connector, for connection to a host device comprising a first module.

* * * * *

UNITED STATES PATENT AND TRADEMARK OFFICE
CERTIFICATE OF CORRECTION

PATENT NO. : 9,935,786 B2  
APPLICATION NO. : 15/063124  
DATED : April 3, 2018  
INVENTOR(S) : Zwart et al.

Page 1 of 2

It is certified that error appears in the above-identified patent and that said Letters Patent is hereby corrected as shown below:

In the Drawings

In Fig. 5, Sheet 5 of 10, delete "$t_{down\ p}$" and insert -- tdownp --, therefor.

In the Specification

In Column 2, Line 26, delete "an clock" and insert -- a clock --, therefor.

In Column 7, Line 34, delete "arrows T." and insert -- arrows ↑. --, therefor.

In Column 8, Line 4, delete "tdownn," and insert -- tdownn. --, therefor.

In Column 9, Line 35, delete "tdownp+tupN," and insert -- tdownp+tupn, --, therefor.

In Column 9, Line 58, delete "$t_1$" and insert -- t1 --, therefor.

In Column 9, Line 65, delete "$t_2$" and insert -- t2 --, therefor.

In Column 10, Line 35, delete "arrows T." and insert -- arrows ↑. --, therefor.

In Column 10, Line 36, delete "low (H)," and insert -- low (L), --, therefor.

In Column 10, Line 52, delete "low (H)," and insert -- low (L), --, therefor.

In Column 11, Line 3, delete "low (H)," and insert -- low (L), --, therefor.

In Column 11, Line 41, delete "low (H)," and insert -- low (L), --, therefor.

In Column 11, Line 61, delete "low (H)," and insert -- low (L), --, therefor.

Signed and Sealed this  
Twenty-fifth Day of September, 2018

Andrei Iancu  
*Director of the United States Patent and Trademark Office*

CERTIFICATE OF CORRECTION (continued)
U.S. Pat. No. 9,935,786 B2

In Column 14, Line 4, delete "$t_1$" and insert -- t1 --, therefor.

In Column 14, Line 12, delete "$t_2$" and insert -- t2 --, therefor.